United States Patent Office 3,004,968
Patented Oct. 17, 1961

3,004,968
PROCESS FOR THE MANUFACTURE
OF AMINO-STEROIDS
Oskar Jeger, Zurich, Jaroslav Kalvoda, Basel, and Paul Buchschacher, Schwerzenbach, Switzerland, assignors to Ciba Pharmaceutical Products Inc., Summit, N.J.
No Drawing. Filed July 22, 1959, Ser. No. 828,709
Claims priority, application Switzerland Aug. 7, 1958
9 Claims. (Cl. 260—239.55)

The present invention provides a new, simple process for the manufacture of amino-steroids, wherein a keto-steroid is reacted with an amine of the formula

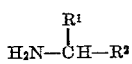

in which $R^1$ represents hydrogen or a substituted or unsubstituted hydrocarbon radical, and $R^2$ a substituted or unsubstituted aryl radical—and the arylideneamino-steroid formed as an intermediate is hydrolysed. The following partial formulae represent the process:

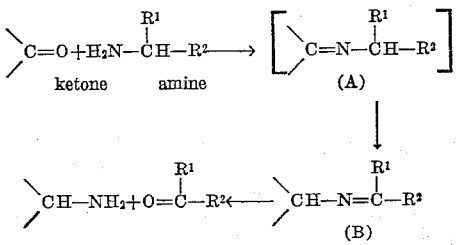

As will be seen from these formulae, the primarily formed imino compound of type A is rearranged into the arylideneamino compound B which latter on being hydrolysed yields the aminosteroid and the arylketone or -aldehyde respectively corresponding to the amine used.

As amine component may be used any desired amine of the above formula, above all a substituted or unsubstituted arylmethylamine such as a benzylamine, diphenylmethylamine, naphthylmethylamine which may be substituted in meta-position relatively to the aminomethyl group, more especially in ortho- or paraposition thereto, by an alkoxy group, for example a methoxy group, a halogen atom, for example chlorine, or by a substituted or unsubstituted phenyl radical.

The reaction according to the invention of the keto-steroid with the amine is performed in a suitable solvent, for example in an alcohol, more especially in an excess of amine, and in the presence of a condensing agent, for example in the presence of a strong inorganic or organic base, such as a hydroxide or an alcoholate of an alkali metal or alkaline earth metal, such as sodium hydroxide, potassium hydroxide, sodium ethylate, sodium methylate, a quaternary ammonium base, for example benzyl-trimethyl ammonium hydroxide. The reaction is advantageously performed with the exclusion of air, for example under nitrogen, at an elevated temperature, for example between about 100 and 200° C.

The hydrolytic cleavage of the arylideneamino-steroid formed is performed with an acid hydrolysing agent, such as a strong inorganic or organic acid, for example hydrochloric, sulfuric, perchloric acid or the like. This process yields the amino-steroids in the form of their salts many of which are relatively sparingly soluble; the free amine is prepared from the salt in as such known manner by alkalinisation with a strong base, such as ammonia, or a solution of sodium carbonate, sodium hydroxide or potassium hydroxide.

The keto-steroids used as starting materials are derived from the known steroid series, such as the cholestane, coprostane, ergostane, sitostane, spirostane, cholane, bisnorcholane, etiocholane, pregnane, allopregnane, androstane, oestrane series, or from tetracyclic triterpenes (4:4:14-trimethyl-steroids), for example from lanosterol. These starting materials contain one or several oxo groups in the positions 1, 2, 3, 4, 6, 7, 11, 12, 15, 16, 17, 18, 19, 20, 21, 22, 23, 24. Apart from the oxo groups they may contain any desired further substituents such as free or functionally converted (for example esterfied or etherified) hydroxyl groups; ketalized, such as acetalized or enolized oxo groups; alkyl groups, such as methyl groups; or free or functionally converted carboxyl groups. These substituents may be contained in one or several of the afore-mentioned positions. The starting materials may be saturated in the ring system or contain double bonds, for example in one or several of the positions 1, 4, 5, 9(11), 11, 14, 16, 17(20). The starting materials are known or can be made by known methods.

The arylideneamino and amino-steroid compounds obtained by the present process are biologically active themselves or can be used as intermediates for the preparation of biologically active compounds.

The compounds can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzylalcohols, gums, polyalkylene glycols, cholesterol or other known carriers. The pharmaceutical preparations can be in the form, for instance, of tablets or dragees or in liquid form as solutions, suspensions or emulsions. They may be sterilized and/or contain auxiliary substances, such as preserving, stabilizing, wetting or emulsifying agents, salts for the modification of osmitic pressure or buffers. They may also contain other therapeutically useful substances. The preparations are obtained in the customary way.

The following examples illustrate the invention.

*Example 1*

500 mg. of cholestanone are dissolved in 20 cc. of freshly distilled benzylamine, 3 grams of sodium methylate are added, and the whole is refluxed for 4 hours. The solution is cooled, poured into an excess of dilute hydrochloric acid (1:4) and kept for 1 hour at 70–80° C. The reaction mixture is then cooled to room temperature, and the precipitated hydrochloride of $3\beta$-aminocholestane is suctioned off and thoroughly washed with water and ether to remove traces of starting material and benzaldehyde. The residue is dissolved in a small amount of methanol, and the solution is treated with solid potassium hydroxide to produce a strongly alkaline reaction. The whole is diluted with water, taken up in ether, washed with water until neutral and dried over sodium sulfate. The ethereal solution is evaporated to yield 438 mg. of crude crystalline $3\beta$-aminocholestane (M.P. 110–112° C. from acetone).

For identification 125 mg. of $3\beta$-amino-cholestane are dissolved in 3 cc. of formic acid; 25 cc. of 40% of formaldehyde are added, and the whole is heated for 4 hours at 100° C. and then kept for 15 hours at room temperature. While cooling with ice, the solution is diluted with water, the surplus formic acid is neutralized with solid potassium hydroxide, and the precipitating free base is taken up in ether. The ethereal solution is washed 6 times with water, drier over sodium sulfate and evaporated, to yield 120 mg. of $3\beta$-dimethylamino-cholestane. After having been recrystallized once from acetone, the product obtained in this manner melts at 100–101° C.

Example 2

2 grams of allopregnane-3β-ol-20-one acetate are dissolved in 40 cc. of benzylamine and refluxed with 6 grams of sodium methylate for 18 hours under nitrogen. To hydrolyse the resulting 20-benzylideneamino-allopregnane-3β-ol, the reaction mixture is cooled, mixed with an excess of dilute hydrochloric acid and heated for 2 hours at 80° C. The water-insoluble hydrochloride of the 20-isomeric amines is filtered while cold and washed out with water and ether. The suspension of the hydrochlorides in methanol is rendered alkaline with concentrated ammonia and then taken up in ether. The ethereal solution is washed with water until neutral, dried and then evaporated, to yield 1.15 grams of a crystallizate which is a mixture of 20α- and 20β-amino-allopregnane-3β-ol. By methylation with formic acid and formaldehyde as described in Example 1, followed by hydrolysis of the 3-formate formed by boiling for 2 hours with 25 cc. of 8% aqueous-alcoholic potassium hydroxide solution, the mixture is converted into the 20-isomeric dimethylamino compounds. Repeated crystallization yields the 20β-dimethylamino-allopregnane-3β-ol which melts at 181–183° C. The mother liquor yields 20α-dimethylamino-allopregnane-3β-ol.

Example 3

10 grams of 11-keto-tigogenin are dissolved in 400 cc. of benzylamine and refluxed for 7 days, while being vibrated, with 40 grams of sodium methylate under nitrogen. The reaction mixture is poured into excess dilute hydrochloric acid, the insoluble matter is filtered off, dissolved in methanol and again combined with the hydrochloric acid solution, which is then heated for 4 hours at 80° C. The precipitated hydrochloride is filtered off and freed from hydrochloric acid, starting material and benzaldehyde by being washed with water and ether. The methanolic suspension of the salt is treated with solid potassium hydroxide, diluted with water, taken up in ether and washed until neutral, to yield 5.241 grams of a crystalline base. This base is separated by chromatography on alumina, to yield 1.54 grams of pure 11β-amino-tigogenin melting at 182–183° C. ($[\alpha]_D^{27}=-56°$) and 1.62 grams of 11α-amino-tigogenin melting at 202–203° C. ($[\alpha]_D^{27}=-39°$).

Example 4

A mixture of 5 grams of hecogenin acetate, 5 grams of sodium methylate, 50 cc. of benzylamine and 2.5 cc. of methanol is refluxed for 24 hours and then kept overnight at room temperature. The benzylidene compound formed is hydrolyzed by being heated for 3 hours with excess aqueous hydrochloric acid. From the cooled mixture the hydrochloride of 12-aminotigogenin is obtained by suction filtration and washing with water, ether and methylene chloride. This latter product yields the base when an alcoholic solution thereof is treated with potassium hydroxide and then worked up. The yield of crude amine amounts to 1.590 grams. Repeated recrystallization from ether yields 12-amino-tigogenin melting at 212–213° C.

Example 5

5 grams of androstane-3β-ol-17-one acetate are dissolved in 70 cc. of benzylamine with the addition of 10 grams of sodium methylate and refluxed overnight. To hydrolyse the 17-benzylideneamino-androstane-3β-ol formed, the reaction mixture is treated with excess aqueous hydrochloric acid (1:4), heated for 4 hours at 80° C. and then kept for 18 hours at room temperature. The partially water-insoluble hydrochloride is suctioned off, washed on the filter with water and ether, and the base is liberated with concentrated ammonia and extracted with ether. The yield is 2.1 grams of amorphous 17-amino-androstane-3β-ol. The aqueous washings are extracted by being shaken with ether and thus freed from benzaldehyde and starting material. Addition of solid potassium hydroxide (with cooling) liberates a further amount of the base and surplus benzylamine. From the mixture of 17-amino-androstane-3β-ol and benzylamine, obtained by shaking with ether and thorough washing of the filter residue with water, the benzylamine is removed by repeated evaporation in vacuo with water and benzene, to yield another 1.3 grams of 17-amino-3β-hydroxy-5α-androstane. Total yield: 3.4 grams.

Example 6

5 grams of 11-keto-allopregnane-3β-ol-20-ethyleneketal acetate are dissolved in 100 cc. of benzylamine, mixed with 20 grams of sodium ethylate and refluxed for 4 days under nitrogen.

The hydrolysis is conducted as described in Examples 1–5. The acid aqueous solution is shaken with ether, to yield 850 mg. of 11:20-diketo-allopregnane-3β-ol. After alkalinisation with potassium hydroxide, shaking with ether and repeated evaporation with water and benzene (to remove the excess of benzylamine) crude 11-amino-allopregnane-3β-ol-20-one is obtained.

What is claimed is:

1. Process for the manufacture of amino-steroids, wherein a keto-steroid is reacted with an amine of the formula

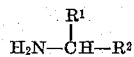

in which $R^1$ represents a member selected from the group consisting of a hydrogen, a substituted and an unsubstituted hydrocarbon radical, and $R^2$ a member selected from the group consisting of a substituted and an unsubstituted aryl radical, in the presence of a basic condensing agent and the arylidene-amino-steroid formed as an intermediate product is hydrolyzed to yield an amino-steroid.

2. Process as claimed in claim 1, wherein the amino-steroids obtained are converted into their therapeutically useful acid addition salts.

3. Process as claimed in claim 1, wherein the keto-steroids are reacted with an arylmethylamine in the presence of a basic condensing agent.

4. Process as claimed in claim 1, wherein an acid hydrolyzing agent is used for the hydrolysis of the arylidene-amino-steroids formed.

5. Process as claimed in claim 1, wherein 3-keto-cholestane is used as starting material.

6. Process as claimed in claim 1, wherein a member selected from the group consisting of 11-keto-tigogenin and an ester thereof is used as starting material.

7. Process as claimed in claim 1, wherein a member selected from the group consisting of hecogenin and an ester thereof is used as starting material.

8. Process as claimed in claim 1, wherein 11-keto-allopregnan-3β-ol-20-ethyleneketal is used as starting material.

9. Process as claimed in claim 1, wherein an ester of 11-keto-allopregnan-3β-ol-20-ethyleneketal is used as starting material.

References Cited in the file of this patent

UNITED STATES PATENTS

| | | |
|---|---|---|
| 2,045,574 | Adkins et al. | June 30, 1936 |
| 2,566,336 | Julian et al. | Sept. 4, 1951 |
| 2,700,682 | Blomberg et al. | Jan. 25, 1955 |
| 2,705,238 | Julian et al. | Mar. 29, 1955 |

OTHER REFERENCES

Hershberg et al.: Chem. & Ind., vol. 45 (November 1958), pages 1477 and 1478.